(12) United States Patent
Abe et al.

(10) Patent No.: US 7,745,057 B2
(45) Date of Patent: Jun. 29, 2010

(54) NONAQUEOUS ELECTROLYTE SECONDARY BATTERY

(75) Inventors: Takeshi Abe, Okazaki (JP); Masato Iwanaga, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 7 days.

(21) Appl. No.: 12/035,808

(22) Filed: Feb. 22, 2008

(65) Prior Publication Data

US 2008/0206652 A1 Aug. 28, 2008

(30) Foreign Application Priority Data

Feb. 23, 2007 (JP) ............... 2007-044310

(51) Int. Cl.
*H01M 6/16* (2006.01)
(52) U.S. Cl. .......... 429/330; 429/331; 429/332; 429/338; 429/199; 429/144; 429/231.1; 429/231.3; 429/231.8; 429/231.4; 429/231.6; 429/223; 429/224; 429/251
(58) Field of Classification Search ........... 429/330, 429/331, 332, 338, 199, 144, 231.1, 231.3, 429/231.8, 231.4, 231.6, 223, 224, 251
See application file for complete search history.

(56) References Cited

U.S. PATENT DOCUMENTS 6,506,524 B1 1/2003 McMillan 7,435,510 B2 * 10/2008 Tode et al. ............ 429/231.3
2007/0281206 A1 * 12/2007 Fujikawa et al. ......... 429/144

FOREIGN PATENT DOCUMENTS

| EP | 0 931 365 B1 | 7/2000 |
|---|---|---|
| JP | 7-220759 A | 8/1995 |
| JP | 2001-501355 A | 1/2001 |
| JP | 2005-38722 A | 2/2005 |
| JP | 2005-85635 A | 3/2005 |
| JP | 2005-317499 A | 11/2005 |
| JP | 2006-310010 A | 11/2006 |
| WO | WO 98/15024 | 4/1998 |

* cited by examiner

*Primary Examiner*—Laura S Weiner
(74) *Attorney, Agent, or Firm*—Westerman, Hattori, Daniels & Adrian, LLP

(57) ABSTRACT

A nonaqueous electrolyte secondary battery 10 according to an embodiment of the invention includes a positive electrode 11, a negative electrode 12, a separator 13 and a nonaqueous electrolyte liquid in which not only the positive electrode 11 contains a positive electrode active material charged at or higher than 4.3 V based on lithium and a halogenated cyclic carbonate is added in the nonaqueous electrolyte liquid, but also an inorganic insulating material particle layer is formed on the surface of at least either of the positive electrode 11, the negative electrode 12 and the separator 13. By employing such a constitution in the present invention, a nonaqueous electrolyte secondary battery using a positive electrode charged at a high electric potential of 4.3 V or more based on lithium in which the amount of a generated gas is small even when the battery is overcharged at higher temperatures, and the impact safety and reliability thereof are high, can be provided.

9 Claims, 1 Drawing Sheet

(related art)

NONAQUEOUS ELECTROLYTE SECONDARY BATTERY

BACKGROUND

1. Technical Field

The present invention relates to a nonaqueous electrolyte secondary battery. Particularly, the present invention relates to a nonaqueous electrolyte secondary battery using a positive electrode charged at a high electric potential higher than 4.3 V based on lithium in which the amount of a generated gas is small even when the battery is continuously charged at higher temperatures, and the impact safety and reliability thereof are high.

2. Related Art

With the rapid spread of portable electronic equipment, the specifications required of the batteries used in such equipment have become more stringent every year, and there is particular demand for batteries that are compact and thin, have high capacity and superior cycling characteristics, and give stable performance. In the field of secondary batteries, attention is focusing on lithium nonaqueous electrolyte secondary batteries, which have high energy density compared with other batteries. These lithium nonaqueous electrolyte secondary batteries are winning an increasingly large share of the secondary battery market.

FIG. 1 is a perspective view showing a related-art cylindrical nonaqueous electrolyte secondary battery by sectioning the battery perpendicularly. This nonaqueous electrolyte secondary battery 10 uses a wound electrode body 14 produced by winding a positive electrode 11, a separator 13 and a negative electrode 12 which are laminated in this order, and is constituted by a method including: disposing insulating plates 15 and 16 respectively on the top side and bottom side of the wound electrode body 14 to prepare a parts set; holding the parts set in the inside of a steel-made cylindrical battery outer packaging can 17 serving also as a negative electrode terminal; welding not only a power collecting tab 12a of the negative electrode 12 to an inside bottom of the battery outer packaging can 17, but also a power collecting tab 11a of the positive electrode 11 to a bottom plate of a current-intercepting opening-sealing body 18 with a built-in safety device; pouring a predetermined nonaqueous electrolyte through an opening of the battery outer packaging can 17; and sealing the battery outer packaging can 17 with the current-intercepting opening-sealing body 18. Such a nonaqueous electrolyte secondary battery has such an excellent effect that battery performance and reliability are high. Further, the current-intercepting opening-sealing body 18 is a part cutting an electric connection between the coil-shaped electrode body 14 and an outside of the battery according to the pressure elevation inside the battery and the battery has such a constitution that once the electric connection has been cut, the electric connection cannot be recovered even when an internal pressure is lowered.

As a negative electrode active material used in the nonaqueous electrolyte secondary battery, carbonaceous materials such as graphite and an amorphous carbon are widely used, since carbonaceous materials have such excellent properties as high safety because dendrites do not grow therein, while having a discharge potential comparable to that of lithium metal or lithium alloy; excellent initial efficiency; advantageous potential flatness; and high density.

Further, as a nonaqueous solvent of a nonaqueous electrolyte liquid, carbonates, lactones, ethers and esters are used individually or in combination of two or more thereof. Among them, particularly carbonates having a large dielectric constant and having a large ion conductivity, thus the nonaqueous electrolyte liquid thereof are frequently used.

On the other hand, as a positive electrode active material, a lithium-transition metal compound oxide such as lithium cobalt oxide ($LiCoO_2$), lithium nickel oxide ($LiNiO_2$), lithium manganese oxide ($LiMnO_2$), spinel-type lithium manganese oxide ($LiMn_2O_4$) and lithium iron oxide ($LiFeO_2$) is used. It is known that by using such a positive electrode in combination with a negative electrode consisting of a carbon material, a 4V-class nonaqueous secondary battery having a high energy density can be obtained. Among them, particularly because of various battery properties more excellent than those of other materials, lithium cobalt oxide and different metal elements-added lithium cobalt oxide are frequently used. However, since not only is cobalt expensive, but also the existing amount of cobalt as a resource is small, for continued use of lithium cobalt oxide as a positive electrode active material of the nonaqueous electrolyte secondary battery, it is desired to make the nonaqueous electrolyte secondary battery having even higher performance and longer life.

For making a nonaqueous electrolyte secondary battery in which lithium cobalt oxide is used as a positive electrode active material, having even higher performance and longer life, it is an essential task to enlarge the capacity and energy density of the battery and improve the safety of the battery. Among them, as a method for enlarging the capacity of the battery, enlarging the density of an electrode material, making a power collector and a separator to be a thin film and enlarging the charging voltage of the battery voltage, are generally known. Among them, enlarging the charging voltage of the battery voltage is a useful technology as a method capable of enlarging capacity without changing the constitution of the battery and is an essential technology for enlarging the capacity and energy density.

In a nonaqueous electrolyte secondary battery using a lithium-containing transition metal oxide such as lithium cobalt oxide as a positive electrode active material and using a carbon material such as graphite as a negative electrode active material, the charging voltage is generally 4.1 to 4.2 V (the electric potential of the positive electrode is 4.2 to 4.3 V based on lithium). Under such a charging condition, only 50 to 60% of the theoretical capacity of the positive electrode active material is utilized in. Therefore, when the charging voltage can be enlarged more, 70% of the theoretical capacity of the positive electrode can be utilized, thereby enabling capacity and energy density of the battery to be enlarged.

For example, JP-A-2005-85635 discloses an invention of a nonaqueous electrolyte secondary battery using a positive electrode active material in which a zirconium-containing compound is attached to the surface of lithium cobalt oxide particles, and capable of achieving advantageous charging/discharging cycle property even when the battery is charged at a high voltage of 4.3 to 4.4 V based on lithium.

Further, JP-A-2005-317499 discloses an invention of a nonaqueous electrolyte secondary battery using a mixture of lithium cobalt oxide and a layer-shaped lithium nickel cobalt manganese oxide to which different metal elements are added as a positive electrode active material, and capable of being stably charged at a high charging voltage. This positive electrode active material is produced so that by adding different metal elements of at least Zr and Mg to lithium cobalt oxide, the structural stability thereof at a high voltage is improved and further, by incorporating a layer-shaped lithium nickel cobalt manganese oxide having high thermal stability at a high voltage, the safety is secured. By using a combination of a positive electrode using the above positive electrode active material and a negative electrode having a negative electrode active material consisting of a carbon material, a nonaqueous electrolyte secondary battery capable of achieving advantageous cycle property and thermal stability even when the charging voltage is a high voltage of 4.3 V or more, has been obtained.

However, when the state of charge of the positive electrode active material is enhanced by further enhancing the charging potential of the nonaqueous battery, the decomposition of an electrolyte on the surface of the positive electrode active material and a structural deterioration of the positive electrode active material itself tend to occur. Such a structural deterioration of the positive electrode active material and decomposition of the electrolyte increase according to the increase of the charging voltage, which leads to the lowering of thermal stability, so that for providing a nonaqueous electrolyte secondary battery which has a large capacity and is capable of maintaining safety compared to that of a conventional battery having a charging voltage of around 4.2 V, there is much room for improvement.

On the other hand, as a technology for enhancing the safety of the nonaqueous electrolyte secondary battery, technologies shown in JP-A-7-220759, JP-A-2006-310010, JP-T-2001-501355 and JP-A-2005-038722 are also known. Specifically, in JP-A-7-220759, there is shown an example in which for the purpose of preventing the short circuit due to an active material which has been eliminated during the production of the nonaqueous electrolyte secondary battery, a porous protecting film having a thickness of 0.1 to 200 μm and consisting of insulating fine particles such as alumina, silica, polyethylene and the like, and a resin binder is formed on the surface of a negative electrode active material-applied layer or a positive electrode active material-applied layer.

In JP-A-2006-310010, there is shown an example in which for achieving a stabilized cycle life, in a nonaqueous electrolyte secondary battery in which a negative electrode has a width/length larger than that of a positive electrode, for the purpose of preventing the short circuit due to dendrites of lithium caused on a terminal face of the negative electrode while repeating the charging and discharging, a porous protecting film consisting of an inorganic oxide filler and a binder is formed on the surface of the positive electrode and/or negative electrode.

In JP-T-2001-501355, there is shown an example in which in an alkali metal ion secondary battery, for the purpose of preventing the short circuit due to the formation of dendritic crystals (dendrites) during the charging, fluoroethylene carbonate and propylene carbonate are incorporated in the nonaqueous electrolyte.

Further, in JP-A-2005-038722, there is shown an example using a nonaqueous electrolyte liquid in which a fluorinated cyclic ester such as fluoroethylene carbonate is added into a nonaqueous electrolyte containing a cyclic carbonate and γ-butylolactone. In the invention disclosed in JP-A-2005-038722, on the surface of the negative electrode, a stabilized film of a fluorinated cyclic ester is formed and by this film, the decomposition of the electrolyte is suppressed, so that not only the cycle property of the battery can be improved, but also the generation of a gas during the storage of the battery at higher temperatures can be suppressed. However, it is described that during an overcharging of the battery, the fluorinated cyclic ester is decomposed and a gas is generated, so that a safety valve can be quickly operated.

As already described above, the nonaqueous electrolyte secondary batteries disclosed in JP-A-7-220759 and JP-A-2006-310010 can suppress the short circuit between the electrodes due to the formation of dendrites during the charging. However, there is no description indicating suppressing the generation of a gas caused by the decomposition of the electrolyte liquid.

The nonaqueous electrolyte secondary battery disclosed in JP-T-2001-501355 can at least suppress the short circuit between the electrodes due to the formation of dendrites during the charging. However, since fluoroethylene carbonate is likely to be reduced, it has the disadvantage that the negative electrode decomposes, thereby generating carbonic acid gas and an organic gas.

Also in the nonaqueous electrolyte secondary battery disclosed in JP-A-2005-038722, since during an overcharging, by making positive use of the decomposition of an added fluorinated cyclic ester such as fluoroethylene carbonate, a safety valve is caused to be quickly operated, a large amount of gas is generated inside the battery. Such generation of a large amount of gas causes a battery swell in a prismatic battery and of an action of a current blocking mechanism in a cylindrical battery, which leads to the lowering of the reliability of the nonaqueous electrolyte secondary battery in the market.

Particularly, in the case of the positive electrode in which the charging is performed at a high electric potential of 4.4 V or more based on lithium, also on the surface of the positive electrode, not only fluoroethylene carbonate, but also dimethyl carbonate (DMC) as another nonaqueous solvent component are likely to be decomposed, so that a larger amount of gas is generated. Moreover, in a nonaqueous electrolyte secondary battery using the positive electrode in which the charging is performed at a high electric potential of 4.4 V or more based on lithium, the positive electrode active material itself is poor in thermal stability, so that there is such a disadvantage that such a nonaqueous electrolyte secondary battery is poor in impact resistance.

SUMMARY

The present inventors have made extensive and intensive studies with respect to behaviors of halogenated cyclic carbonates disclosed in JP-712001-501355 and JP-A-2005-038722 during the charging/discharging of the nonaqueous electrolyte secondary battery. As a result, it has been found that a halogenated cyclic carbonate has an effect of improving thermal stability of the positive electrode active material and such an effect becomes larger in proportion to the content of a halogenated cyclic carbonate. Then, the present inventors have conducted further experiments and have found that by combining technologies for forming an inorganic porous protection film on the surface of the positive electrode, negative electrode or separator as disclosed in JP-A-7-220759 and JP-A-2006-310010 with the above novel findings, even in the nonaqueous electrolyte secondary battery using the positive electrode in which the charging is performed at an electric potential higher than 4.3 V, further at a high electric potential of 4.4 V or more based on lithium, even when the charging is continuously performed at higher temperatures, not only the amount of a generated gas can be reduced, but also the impact safety of this battery can be maintained at the same level as that of a conventional model of the battery. Based on these findings, the present invention has been completed.

In other words, an advantage of some aspects of the present invention is to provide a nonaqueous electrolyte secondary battery using a positive electrode in which the charging is performed at a high electric potential higher than 4.3 V based on lithium in which the generation of a gas is small even when the charging is continuously performed at higher temperatures, and the impact safety and reliability thereof are high.

A nonaqueous electrolyte secondary battery according to an aspect of the present invention includes a positive electrode, a negative electrode, a separator and a nonaqueous electrolyte liquid in which not only the positive electrode contains a positive electrode active material charged at an electric potential higher than 4.3 V based on lithium and a halogenated cyclic carbonate is added in the nonaqueous electrolyte liquid, but also an inorganic insulating material particle layer is formed on the surface of at least either of the positive electrode, the negative electrode and the separator.

In the nonaqueous electrolyte secondary battery of the present aspect of the invention, it is necessary that the nonaqueous electrolyte liquid contains a halogenated cyclic carbonate and that on the surface of at least either of the positive electrode, the negative electrode and the separator, an inorganic insulating material particle layer is formed. When not only the nonaqueous electrolyte liquid does not contain a halogenated cyclic carbonate, but also on the surface of neither the positive electrode, the negative electrode nor the separator, an inorganic insulating material particle layer is formed, the battery is poor in impact safety and the amount of a gas generated during a continuous charging at higher temperatures is large.

Further, even when the nonaqueous electrolyte liquid contains a halogenated cyclic carbonate, when on the surface of neither the positive electrode and the negative electrode nor the separator, an inorganic insulating material particle layer is formed, though the impact safety of the battery is advantageous, the amount of a gas generated during a continuous charging at higher temperatures is extremely large.

The inorganic insulating material particles used in the nonaqueous electrolyte secondary battery of the present aspect of the invention can be appropriately selecting so long as they are thermally stable, do not react with Li ion, do not decompose the nonaqueous electrolyte liquid and are an insulating material. In the nonaqueous electrolyte secondary battery of the present aspect of the invention, though an influence on the action effect depending on the type of the inorganic insulating material particles is extremely small, from the viewpoint of the easiness and cost of the production of the battery, an inorganic oxide is preferred.

As the positive electrode active material used in the nonaqueous electrolyte secondary battery of the present aspect of the invention, lithium cobalt oxide, spinel-type lithium manganese oxide, a lithium cobalt compound oxide which is lithium cobalt oxide containing at least both of zirconium and magnesium, a lithium manganese nickel compound oxide containing at least both of manganese and nickel and having a layer-shaped structure, or a mixture thereof can be used.

As the lithium cobalt compound oxide which is lithium cobalt oxide containing at least both of zirconium and magnesium, lithium cobalt oxide to which zirconium and magnesium are added as different elements during the synthesis thereof can be used. Zirconium content thereof is preferably in the range of 0.01 to 1 mol % and magnesium content thereof is preferably in the range of 0.01 to 3 mol %. Further, besides zirconium and magnesium, aluminum, titanium, tin and the like may also be contained.

As the layer-shaped lithium manganese nickel compound oxide, preferred is $Li_bMn_sNi_tCo_uO_2$ (wherein, $0<b\leq1.2$, $0<s\leq0.5$, $0<t\leq0.5$, $0\leq u$, $s+t+u=1$, $0.95\leq s/t\leq1.05$) in which the molar ratios of Ni and Mn are substantially the same as each other.

Particularly, from the mixture of the lithium cobalt compound oxide which is lithium cobalt oxide containing at least both of zirconium and magnesium, and the layer-shaped lithium manganese nickel compound oxide, the positive electrode having high thermal stability even when the charging electric potential is caused to be higher than 4.4 V can be obtained.

In the present aspect of the invention, as the halogenated cyclic carbonate, a halogen-substituted carbonate such as ethylene carbonate (EC), propylene carbonate (PC), and butylene carbonate (BC) can be used. Examples of the halogen-substituted carbonate may include: fluoroethylene carbonate (FEC), fluoropropylene carbonate, fluorobutylene carbonate, chloroethylene carbonate, chloropropylene carbonate, chlorobutylene carbonate, bromoethylene carbonate, bromopropylene carbonate and bromobutylene carbonate. Among them, particularly preferred is fluoroethylene carbonate.

Examples of the nonaqueous solvent (organic solvent) constituting the nonaqueous solvent electrolyte in the present aspect of the invention may include carbonates, lactones, ethers, ketones and esters and these solvents can be used also in combination of two or more types thereof. Among them, carbonates, lactones, ethers, and esters are preferred and carbonates are more preferred.

Specific examples of the above nonaqueous solvent may include: ethylene carbonate (EC), propylene carbonate (PC), butylene carbonate (BC), vinylene carbonate (VC), 1,2-cyclohexyl carbonate (CHC), cyclopentanone, sulfolane, 3-methylsulfolane, 2,4-dimethylsulfolane, 3-methyl-1,3-oxazolidine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butylolactone, γ-valerolactone, 1,2-dimethoxyethane, tetrahydrofuran, 2-methyl tetrahydrofuran, 1,3-dioxolane, methyl acetate, ethyl acetate and 1,4-dioxane.

In the present aspect of the invention, in terms of enhancing the charging/discharging efficiency, a mixed solvent containing a halogenated cyclic carbonate, further containing EC as a cyclic carbonate, DMC, MEC or DEC as a chain carbonate and the like is suitably used. Further, since EC is likely to be oxidation-decomposed at a high electric potential, it is preferred that the nonaqueous electrolyte contains 30 vol % of EC and another content of a chain carbonate.

As a solute of the nonaqueous electrolyte in the present aspect of the invention, a lithium salt used generally as a solute in a nonaqueous electrolyte secondary battery can be used. Examples of the lithium salt include: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and a mixture thereof. Among them, $LiPF_6$ (hexafluoro lithium phosphate) is preferably used. The amount of a solute dissolved in the nonaqueous solvent is preferably 0.5 to 2.0 mol/L.

Further, in the nonaqueous electrolyte secondary battery of the present aspect of the invention, the positive electrode contains preferably a positive electrode active material charged at 4.4 V or more based on lithium.

When the charging electric potential can be enhanced, in proportion thereto, a capacity of the positive electrode larger than the theoretical capacity can be utilized, so that the enlarging of the capacity and energy density of the nonaqueous electrolyte secondary battery becomes capable. However, since when the charging potential is too high, a structural deterioration of the positive electrode active material and the decomposition of the component of the electrolyte liquid on the surface of the positive electrode are frequently caused, a preferred upper limit value thereof is 4.6 V based on lithium. Examples of such a positive electrode active material include an active material composed of a mixture of lithium cobalt compound oxide which is lithium cobalt oxide containing at least both of zirconium and magnesium with a layer-shaped lithium manganese nickel compound oxide containing at least both of manganese and nickel and having a layer-shaped structure.

Further, in the nonaqueous electrolyte secondary battery of the present aspect of the invention, the content of the halogenated cyclic carbonate in the nonaqueous electrolyte liquid is preferably 10 to 30 vol % based on the volume of an organic solvent constituting the nonaqueous electrolyte liquid at 25° C. and under 1 atom.

When the content of the halogenated cyclic carbonate in the nonaqueous electrolyte liquid is less than 10 vol %, the impact safety of the battery is poor. On the other hand, when the content is more than 30 vol %, though the impact safety is advantageous, not only the initial capacity is lowered, but also the amount of a gas generated during a continuous charging at higher temperature becomes large.

Further, in the nonaqueous electrolyte secondary battery of the present aspect of the invention, the inorganic insulating material particle layer is preferably at least one selected from titania of rutile type, alumina and magnesia.

These inorganic insulating material particles are thermally stable, do not react with lithium ions and have an effect of suppressing the generation of a gas by preventing the decomposition of the nonaqueous electrolyte liquid. Taking the easiness of the production, the stability within the battery, the reactivity with lithium and the cost into consideration, alumina or titania of rutile type is preferred. These inorganic insulating material particles have preferably an average particle diameter of 1 μm or less. Since titania in an anataze structure is capable of intercalating and deintercalating lithium ions and intercalates lithium ions depending on the environmental atmosphere and electric potential to exhibit electron conductivity, there is a risk of the capacity lowering of the battery and the short circuit, which is not preferred.

Further, in the nonaqueous electrolyte secondary battery of the present aspect of the invention, the average pore size of the separator is preferably smaller than the average particle diameter of the inorganic insulating material particles contained in the inorganic insulating material particle layer.

In the nonaqueous electrolyte secondary battery of the present aspect of the invention, the inorganic insulating material particles are provided on the surface of at least either of the positive electrode, negative electrode and separator by a binder. However, taking a relaxation of damage against the separator by peeled particles due to the lowering of the adhesive strength of the binder, for example, and the suppression of the irruption of the particles into fine pores into consideration, it is particularly preferred that the average particle diameter is larger than the average pore size.

Further, in the nonaqueous electrolyte secondary battery of the present aspect of the invention, the thickness of the above inorganic insulating material particle layer is preferably 1 μm or more and 4 μm or less total on both surfaces of the positive electrode, negative electrode or separator.

Even when the thickness of the inorganic insulating material particle layer is around 1 μm total on both surfaces, a predetermined action effect thereof can be satisfactorily exhibited, and the larger the thickness is, the higher the effect is. However, since the increase of the thickness of the inorganic insulating material particle layer is remarkably reflected to the lowering of the load properties and energy density of the battery, the thickness should be preferably 4 μm or less total on both surfaces and be desirably 2 μm or less on a single surface.

Thanks to the above-described constitution, even when the positive electrode active material is charged at a high electrical potential such as 4.40 V or higher based on lithium, a nonaqueous electrolyte secondary battery not only having excellent impact safety, but also by which the amount of a gas generated during a continuous charging at higher temperatures is small to provide high reliability can be obtained.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
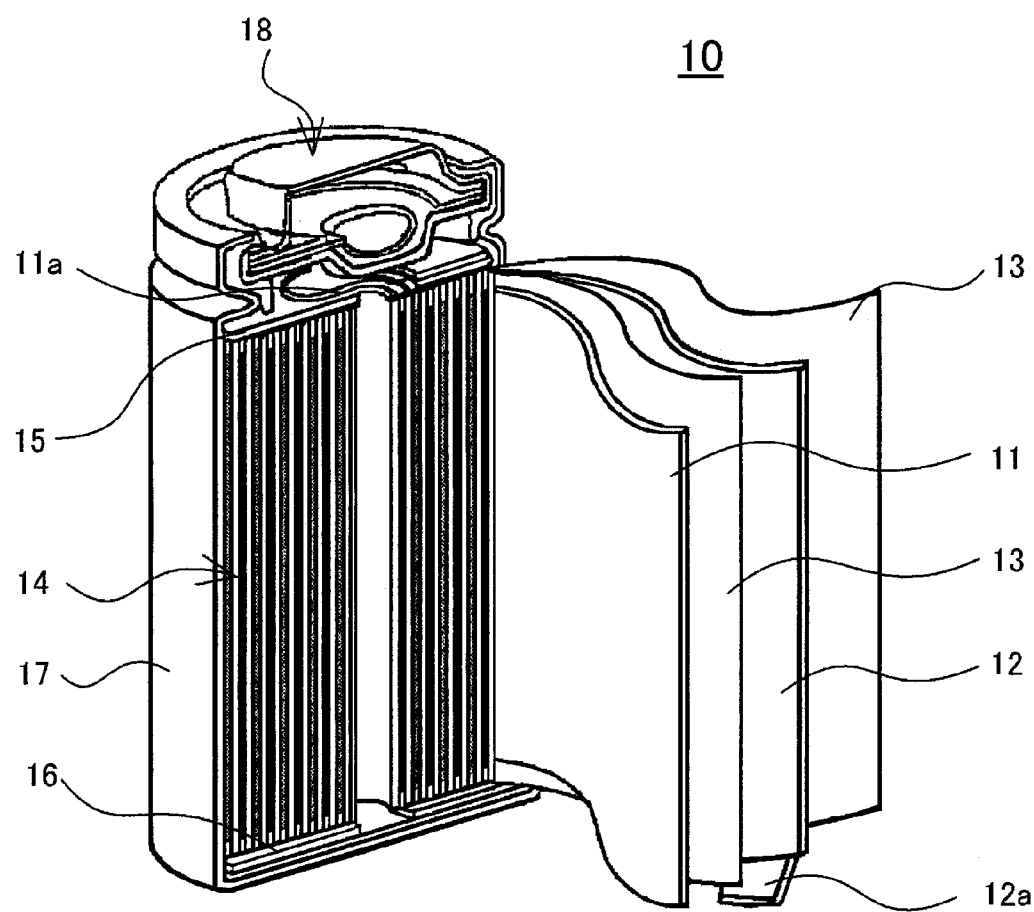
FIG. 1 is a perspective view showing a cylindrical nonaqueous electrolyte secondary battery by sectioning the battery perpendicularly.

Hereinafter, exemplary embodiments for carrying out the present invention are described more specifically referring to various Embodiments and Comparatives Examples. Since the constitution of nonaqueous electrolyte secondary batteries used in Embodiments and Comparatives Examples is substantially the same as that of a related-art cylindrical nonaqueous electrolyte secondary battery shown in FIG. 1, if necessary, the description is performed referring to FIG. 1. However, the following Embodiments illustrate only examples of cylindrical nonaqueous electrolyte secondary batteries as nonaqueous electrolyte secondary batteries for embodying the technical concept of the present invention and it is not intended that the present invention is specified to these Embodiments, so that the present invention can be equally applied also to various modifications such as a prismatic nonaqueous electrolyte secondary battery without departing from the technical concept shown in the appended Claims.

First, a specific production method and measuring methods of various properties of the nonaqueous electrolyte secondary batteries common to Embodiments and Comparative Examples are described.

Preparation of Positive Electrode

Lithium cobalt oxide was prepared as follows. With respect to the starting material, as a lithium source, lithium carbonate ($Li_2CO_3$) was used and as a cobalt source, tricobalt tetraoxide containing magnesium, aluminum and zirconium obtained by coprecipitating cobalt (Co) and magnesium (Mg) and aluminum (Al) and zirconium (Zr) and by subjecting the resultant coprecipitation to a thermal decomposition reaction was used. Predetermined amounts of these raw materials were weighed and mixed and in an air atmosphere, the resultant mixture was sintered at 850° C. for 24 hours to obtain lithium cobalt oxide containing magnesium, aluminum and zirconium. The obtained lithium cobalt oxide was ground with a mortar to an average particle diameter of 14 μm to obtain a positive electrode active material A.

Layer-shaped lithium manganese nickel compound oxide was prepared as follows. With respect to the starting material, as a lithium source, lithium carbonate ($Li_2CO_3$) was used and as a transition metal source, a coprecipitated hydroxide represented by $Ni_{0.33}Mn_{0.33}Co_{0.34}(OH)_2$ was used. Predetermined amounts of these raw materials were weighed and mixed and in an air atmosphere, the resultant mixture was sintered at 1000° C. for 20 hours to obtain layer-shaped lithium manganese nickel oxide containing cobalt represented by $LiNi_{0.33}Mn_{0.33}Co_{0.34}O_2$. The obtained layer-shaped lithium manganese nickel oxide containing cobalt was ground with a mortar to an average particle diameter of 5 μm to obtain a positive electrode active material B.

The thus obtained positive electrode active materials A and B were mixed in a mass ratio of 9:1 to obtain a mixed positive electrode active material. Next, the mixed positive electrode active material, acetylene black and a powder of poly(vinilidene fluoride) (PVdF) as positive electrode conductive agents in a mass ratio of positive electrode active material: acetylene black:PVdF=94:3:3 were charged into N-methyl-2-pyrrolidone (NMP) and kneaded to prepare a slurry. The slurry was applied to both surfaces of a positive electrode power collecting body made of aluminum foil having a thickness of 15 μm by a doctor blade method, and dried to form a positive electrode active material layer on both surfaces of the positive electrode power collecting body. Thereafter, the positive electrode power collecting body was compressed using a compression roller to prepare the positive electrode. The prepared positive electrode was used commonly in the First to Eighth Embodiments and the First to Eleventh Comparative Examples.

Preparation of Negative Electrode

A dispersion of a graphite powder as the negative electrode active material and a styrene-butadiene rubber (SBR) (styrene:butadiene=1:1) was dispersed in water and thereto, further carboxymethyl cellulose (CMC) as a thickening agent was added to prepare a negative electrode active material mixture slurry. The negative electrode active material mixture slurry was prepared so that the dried mass ratio of graphite: SBR:CMC became 95:3:2. The negative electrode active material mixture slurry was applied to both surfaces of a negative electrode power collecting body made of copper foil having a thickness of 8 μm by a doctor blade method, then dried and compressed using a compression roller to prepare the negative electrode. The prepared negative electrode was used commonly in the First to Eighth Embodiments and the First to Eleventh Comparative Examples.

The electrode potential of the negative electrode using a carbonaceous material as the negative electrode active material is 0.1 V based on lithium. Therefore, when the charging potential of the positive electrode is 4.3 V, 4.4 V, and 4.45 V based on lithium, the charging potential of the nonaqueous electrolyte secondary batteries in which the positive electrode is combined with the active material using a carbonaceous material as the negative electrode active material is respectively 4.2 V; 4.3 V, and 4.35 V.

Forming of Inorganic Insulating Material Particle Layer

As inorganic insulating materials, fine particles of alumina having an average particle diameter of 0.4 μm, particles of titania having a rutile structure or magnesia, and a copolymer containing an acrylonitrile structure unit which is a gummy polymer, a dispersant and acetone as a solvent were mixed to prepare a slurry. The slurry was applied to both surfaces of the positive electrode, negative electrode or separator respectively which was thereafter dried and rolled to prepare the positive electrode, negative electrode or separator which was coated with an inorganic insulating material particle layer.

Preparation of Electrolyte

A mixed solvent in which fluoroethylene carbonate (FEC), ethylene carbonate (EC) and dimethyl carbonate (DMC) were mixed in volume ratios (at 25° C.) shown in Table 1, was prepared and therein, $LiPF_6$ was dissolved to be 1 mol/L to prepare the nonaqueous electrolyte liquid.

Preparation of Batteries

Using the above-described positive electrode and negative electrode, by winding both electrodes between which the separator was interposed, a wound electrode body was prepared. After the wound electrode body was inserted into a cylindrical outer packing can, the above-described electrolyte liquid was poured thereinto and by sealing an opening of the outer packing can with a current-intercepting opening-sealing body, the nonaqueous electrolyte secondary batteries having a diameter of 18 mm and a height of 65 mm according to the First to Eighth Embodiments and the First to Eleventh Comparative Examples was prepared. The designed capacity of the nonaqueous electrolyte secondary batteries was 2800 mAh at a charging voltage of 4.35 V.

The constitution of the separator, positive electrode or negative electrode in which on both surfaces, the inorganic insulating material particle layer was formed to be used in the First to Eighth Embodiments and the First to Eleventh Comparative Examples respectively, was as follows.

First, Fourth to Sixth Embodiments and Eighth Comparative Example

The nonaqueous electrolyte secondary batteries according to the First, Fourth to Sixth Embodiments and Eighth Comparative Example used a separator whose both surfaces were coated with an inorganic insulating material particle layer. The thickness of the inorganic insulating material particle layer was 4 μm total on both surfaces. As the inorganic insulating material particles, the First, Fourth Embodiments and Eighth Comparative Example used alumina, the Fifth Embodiment used titania in rutile type and the Sixth Embodiment used magnesia.

Second, Seventh Embodiments and Ninth Comparative Example

In the Second, Seventh Embodiments and Ninth Comparative Example, a positive electrode whose both surfaces were coated with an inorganic insulating material particle layer containing alumina was used. The thickness of the inorganic insulating material particle layer was 4 μm total on both surfaces.

Third, Eighth Embodiments and Tenth Comparative Example

In the Third, Eighth Embodiments and Tenth Comparative Example, a negative electrode whose both surfaces were coated with an inorganic insulating material particle layer containing alumina was used. The thickness of the inorganic insulating material particle layer was 4 μm total on both surfaces.

With respect to each battery according to the First to Eighth Embodiments and First to Tenth Comparative Examples prepared as described above, various charging/discharging tests were performed under the below described conditions.

Measurement of Battery Initial Capacity

First, each battery was charged in a thermostatic chamber maintained at 25° C. using a constant current of 1 It=2700 mAh and after the battery voltage reached 4.20 V (Comparative Example 1), 4.30 V (Comparative Example 2), or 4.35 V (First to Eighth Embodiments and Third to Tenth Comparative Examples) respectively, each battery was charged at a constant voltage of 4.20 V (Comparative Example 1), 4.30 V (Comparative Example 2), or 4.35 V (First to Eighth Embodiments and Third to Tenth Comparative Examples) respectively until the charging current value reached (1/50) It=54 mA. Thereafter, after the charging was discontinued for 10 minutes, the charged batteries were discharged using a constant current of 1 It until the battery voltage reached 3.0 V to measure the initial capacity of each battery. The results are summarized in Table 1.

Impact Test

Each battery of which initial capacity was measured was charged in a thermostatic chamber maintained at 25° C. using a constant current of 1 It=2700 mAh and after the battery voltage reached 4.20 V (Comparative Example 1), 4.30 V (Comparative Example 2), or 4.35 V (First to Eighth Embodiments and Third to Tenth Comparative Examples) respectively, each battery was charged at a constant voltage of 4.20 V (Comparative Example 1), 4.30 V (Comparative Example 2), or 4.35 V (First to Eighth Embodiments and Third to Tenth Comparative Examples) respectively until the charging current value reached (1/50) It=54 mA.

Each cylindrical battery in a fully-charged state was laid still on a plane surface and a round bar having a diameter of 15.8 mm was placed on the center of the battery perpendicularly to the entire height direction of the battery. Thereafter, from an elevation 61 cm or higher that of the battery, a weight of 9.1 kg was dropped onto the battery to confirm the presence of blowout, burning and smoking.

Batteries in which any one of blowout, burning and smoking was caused were evaluated as "NG" and batteries in which none of them was caused were evaluated as "OK". The results are summarized in Table 1.

Measurement Higher Temperatures Continuous Charging Properties

Each battery of which initial capacity was measured as described above was charged in a thermostatic chamber maintained at 60° C. using a constant current of 1 It=2700 mAh and after the battery voltage reached 4.20 V (Comparative Example 1), 4.30 V (Comparative Example 2), or 4.35 V (First to Eighth Embodiments and Third to Tenth Comparative Examples) respectively, each battery was maintained at 4.20 V (Comparative Example 1), 4.30 V (Comparative Example 2), or 4.35 V (First to Eighth Embodiments and Third to Tenth Comparative Examples) respectively and constant voltage-charged continuously to measure the time until the current-intercepting opening-sealing body 18 (see FIG. 1) started to operate.

The time until the current-intercepting opening-sealing body started to operate was classified into three levels such as Level 1: less than 200 hours, Level 2:200 to less than 300 hours and Level 3:300 hours or more, and is summarized in Table 1. Since this time until the current-intercepting opening-sealing body started to operate is inversely proportional to the amount of a gas generated inside the battery, "Level 1" indicates that the generated gas amount is the largest and "Level 3" indicates that the generated gas amount is the smallest.

TABLE 1

| | Charging voltage | Spec. | Electrolyte composition (vol %) | | | | Inorganic insulating material coating layer | Initial capacity | Impact safety (in fully charged state) | CID operation time* (60° C. continuously charged) |
|---|---|---|---|---|---|---|---|---|---|---|
| | | | $LiPF_6$ | EC | FEC | DMC | | | | |
| Comparative 1 | 4.20 V | FEC 0% | 1.0M | 30% | 0% | 70% | None | 2491 mAh | OK | Level 3 |
| Comparative 2 | 4.30 V | FEC 0% | 1.0M | 30% | 0% | 70% | None | 2639 mAh | NG | Level 2 |
| Comparative 3 | 4.35 V | FEC 0% | 1.0M | 30% | 0% | 70% | None | 2752 mAh | NG | Level 2 |
| Comparative 4 | 4.35 V | FEC 10% | 1.0M | 20% | 10% | 70% | None | 2733 mAh | OK | Level 1 |
| Comparative 5 | 4.35 V | FEC 15% | 1.0M | 15% | 15% | 70% | None | 2710 mAh | OK | Level 1 |
| Comparative 6 | 4.35 V | FEC 30% | 1.0M | 0% | 30% | 70% | None | 2708 mAh | OK | Level 1 |
| Comparative 7 | 4.35 V | FEC 40% | 1.0M | 0% | 40% | 60% | None | 2685 mAh | OK | Level 1 |
| Embodiment 1 | 4.35 V | FEC 10% | 1.0M | 20% | 10% | 70% | Separator (Alumina) | 2729 mAh | OK | Level 3 |
| Embodiment 2 | 4.35 V | FEC 10% | 1.0M | 20% | 10% | 70% | Positive electrode (Alumina) | 2733 mAh | OK | Level 3 |
| Embodiment 3 | 4.35 V | FEC 10% | 1.0M | 20% | 10% | 70% | Negative electrode (Alumina) | 2731 mAh | OK | Level 3 |
| Embodiment 4 | 4.35 V | FEC 30% | 1.0M | 0% | 30% | 70% | Separator (Alumina) | 2720 mAh | OK | Level 3 |
| Embodiment 5 | 4.35 V | FEC 30% | 1.0M | 0% | 30% | 70% | Separator (Titanina) | 2715 mAh | OK | Level 3 |
| Embodiment 6 | 4.35 V | FEC 30% | 1.0M | 0% | 30% | 70% | Separator (Magnesia) | 2718 mAh | OK | Level 3 |
| Embodiment 7 | 4.35 V | FEC 30% | 1.0M | 0% | 30% | 70% | Positive electrode (Alumina) | 2705 mAh | OK | Level 3 |
| Embodiment 8 | 4.35 V | FEC 30% | 1.0M | 0% | 30% | 70% | Negative electrode (Alumina) | 2708 mAh | OK | Level 3 |

TABLE 1-continued

|  | Charging voltage | Electrolyte composition (vol %) | | | | Inorganic insulating material coating layer | Initial capacity | Impact safety (in fully charged state) | CID operation time* (60° C. continuously charged) |
| --- | --- | --- | --- | --- | --- | --- | --- | --- | --- |
|  |  | Spec. | LiPF$_6$ | EC | FEC | DMC |  |  |  |
| Comparative 8 | 4.35 V | FEC 40% | 1.0M | 0% | 40% | 60% | Separator (Alumina) | 2687 mAh | OK | Level 2 |
| Comparative 9 | 4.35 V | FEC 40% | 1.0M | 0% | 40% | 60% | Positive electrode (Alumina) | 2680 mAh | OK | Level 2 |
| Comparative 10 | 4.35 V | FEC 40% | 1.0M | 0% | 40% | 60% | Negative electrode (Alumina) | 2684 mAh | OK | Level 2 |

FEC: Fluoroethylene carbonate
EC: Ethylene carbonate
DMC: Dimetyl carbonate
CID: Current-intercepting opening-sealing body
*Level 1: less than 200 hours; Level 2: 200 to Less than 300 hours; Level 3: 300 hours or more From the results shown in Table 1, the followings are apparent. Comparative Examples 1 to 3 did not contain fluoroethylene carbonate (FEC) and moreover, on the surface of any of the separator, positive electrode and negative electrode, the inorganic insulating material particle layer was not formed. The results with charging voltages of 4.20 V (Comparative Example 1), 4.30 V (Comparative Example 2) and 4.35 V (Comparative Example 3) are shown. From the results of Comparative Examples 1 to 3, it is apparent that accompanying the increase of the charging voltage, not only the initial capacity of the batteries was increased and the impact safety was lowered, but also the time until the current-intercepting opening-sealing body started to operate became shorter. Therefore, it was confirmed that by simply increasing the charging voltage, though the enlarging of the initial capacity can be achieved, the safety and reliability cannot be maintained.

In each of the First to Eighth Embodiments and the Fourth to Eleventh Comparative Examples, the charging voltage was 4.35 V and in them, when the content of fluoroethylene carbonate (FEC) was varied from 10 vol % to 40 vol %, the results of a case where on either of the separator, the positive electrode and the negative electrode, the coating of the inorganic insulating material particles was not formed (Fourth to Seventh Comparative Examples), of a case where on both surfaces of the separator, the coating of the inorganic insulating material particles was formed (First, Fourth to Sixth Embodiments and Eighth Comparative Example), of a case where on both surfaces of the positive electrode, the coating of the inorganic insulating material particles was formed (Second and Seventh Embodiments and Ninth Comparative Example) and of a case where on both surfaces of the negative electrode, the coating of the inorganic insulating material particles was formed (Third and Eighth Embodiments and Tenth Comparative Example) are shown.

In each of the First to Eighth Embodiments and the Fourth to Tenth Comparative Examples, a result of "OK" for impact safety was obtained. Therefrom, it is apparent that when the nonaqueous electrolyte liquid contains 10 vol % or more of fluoroethylene carbonate (FEC), even when on either of the separators, the positive electrode and the negative electrode, the coating of the inorganic insulating material particles is not formed, an improving effect for impact safety can be confirmed.

However, in the Fourth to Seventh Comparative Examples, the time until the current-intercepting opening-sealing body started to operate was "Level 1", which means that the gas generated amount was the largest. Further, in the Eighth to Tenth Comparative Examples in which though on any of the separator, the positive electrode and the negative electrode, the coating of the inorganic insulating material particles was formed, the content of fluoroethylene carbonate (FEC) was 40 vol %, the time until the current-intercepting opening-sealing body started to operate was "Level 2", which means that the gas generated amount was large.

On the contrary, in the First to Eighth Embodiments in which though on any of the separator, the positive electrode and the negative electrode, the coating of the inorganic insulating material particles was formed, the content of fluoroethylene carbonate (FEC) was 10 to 30 vol %, the time until the current-intercepting opening-sealing body started to operate was "Level 3", which means that the gas generated amount was the smallest. Therefore, from this result, it is apparent that from the viewpoint of the initial capacity and the reliability, the content of fluoroethylene carbonate (FEC) in the nonaqueous electrolyte liquid is preferably 10 vol % or more and 30 vol % or less.

Further, the Fourth to Sixth Embodiments show the results under substantially the same condition, except that the compositions of the inorganic insulating material particles provided on both surfaces of the separator were alumina in the Fourth Embodiment, titania in rutile-type in the Fifth Embodiment and magnesia in the Sixth Embodiment. According to the results shown in the Fourth to Sixth Embodiments, with respect to the initial capacity, the impact safety and the time until the current-intercepting opening-sealing body started to operate, the same result was obtained, so that it could be confirmed that the difference in the type of the inorganic insulating material particles does not affect the result.

While the First to Eighth Embodiments show an example using a copolymer containing an acrylonitrile structure unit as a binder for forming the inorganic insulating material particle layer, a material of the binder can be appropriately selected and used so long as the material is not only a gummy polymer but also a material swelling by absorbing the electrolyte liquid. Examples of the binder material include, besides the above example, polyacrylonitrile (PAN), poly (vinylidene fluoride) (PVdF) and copolymers thereof.

What is claimed is:

1. A nonaqueous electrolyte secondary battery comprising:
   a positive electrode;
   a negative electrode;
   a separator; and
   a nonaqueous electrolyte liquid, wherein a nonaqueous electrolyte liquid is constituted by nonaqueous solvent and nonaqueous electrolyte,
   wherein the positive electrode contains a positive electrode active material charged at an electric potential higher than 4.3 V based on lithium,
   the nonaqueous solvent contains a halogenated cyclic carbonate, a cyclic carbonate, and a chain carbonate, wherein the halogenated cyclic carbonate content is 10 to 30 vol % based on the volume of the nonaqueous solvent, the cyclic carbonate content is greater than 0 vol % and less than or equal to 30 vol % based on the volume of the nonaqueous solvent, and the remainder is chain carbonate, and
   an inorganic insulating material particle layer is formed on the surface of at least either of the positive electrode, the negative electrode and the separator.

2. The nonaqueous electrolyte secondary battery according to claim 1, wherein the positive electrode comprises the positive electrode active material charged at 4.4 V or more based on lithium.

3. The nonaqueous electrolyte secondary battery according to claim 1, wherein the inorganic insulating material particle layer is at least one selected from titania having a rutile structure, alumina and magnesia.

4. The nonaqueous electrolyte secondary battery according to claim 1, wherein the average pore size of the separator is smaller than the average particle diameter of inorganic insulating material particles contained in the inorganic insulating material particle layer.

5. The nonaqueous electrolyte secondary battery according to claim 1, wherein the thickness of the inorganic insulating material particle layer is 1 µm or more and 4 µm or less total on both surfaces of the positive electrode, negative electrode or separator.

6. The nonaqueous electrolyte secondary battery according to claim 1, wherein the halogenated cyclic carbonate in the nonaqueous electrolyte liquid is fluoroethylene carbonate.

7. The nonaqueous electrolyte secondary battery according to claim 1, wherein the positive electrode active material is a mixture of layer-shaped lithium manganese nickel compound oxide and lithium cobalt compound oxide containing at least both zirconium and magnesium.

8. The nonaqueous electrolyte secondary battery according to claim 7, wherein the layer-shaped lithium manganese nickel compound oxide is $Li_bMn_sNi_tCo_uO_2$ wherein, $0 < b \leq 1.2$, $0 < s \leq 0.5$, $0 < t \leq 0.5$, $0 \leq u$, $s+t+u=1$, $0.95 \leq s/t \leq 1.05$.

9. The nonaqueous electrolyte secondary battery according to claim 7, wherein the content ratio of the zirconium and the magnesium in the lithium cobalt compound oxide containing at least both zirconium and magnesium are in the range of 0.01 to 1 mol % and 0.01 to 3 mol % respectively.

* * * * *